(12) United States Patent
Wakita et al.

(10) Patent No.: US 11,598,013 B2
(45) Date of Patent: Mar. 7, 2023

(54) ELECTROCHEMICAL HYDROGEN COMPRESSOR AND METHOD FOR OPERATING ELECTROCHEMICAL HYDROGEN COMPRESSOR

(71) Applicant: Panasonic Intellectual Property Management Co., Ltd., Osaka (JP)

(72) Inventors: Hidenobu Wakita, Kyoto (JP); Yuuichi Yakumaru, Kyoto (JP); Kunihiro Ukai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 490 days.

(21) Appl. No.: 16/928,047

(22) Filed: Jul. 14, 2020

(65) Prior Publication Data
US 2020/0343567 A1     Oct. 29, 2020

Related U.S. Application Data

(63) Continuation of application No. PCT/JP2019/036272, filed on Sep. 17, 2019.

(30) Foreign Application Priority Data

Nov. 5, 2018   (JP) .............................. JP2018-207974

(51) Int. Cl.
*C25B 15/027*      (2021.01)
*C25B 1/02*        (2006.01)
(Continued)

(52) U.S. Cl.
CPC .............. *C25B 15/027* (2021.01); *C25B 1/02* (2013.01); *C25B 15/02* (2013.01); *C25B 15/08* (2013.01); *C25B 9/23* (2021.01)

(58) Field of Classification Search
CPC ...... C25B 15/02; C25B 15/027; B01D 53/326
See application file for complete search history.

(56) References Cited

U.S. PATENT DOCUMENTS 10,811,712 B2 * 10/2020 Sakai ...................... C01B 3/503
2004/0040862 A1 * 3/2004 Kosek ................ C01B 13/0255
205/637
(Continued)

FOREIGN PATENT DOCUMENTS

EP        3492630 A1    6/2019
EP        3556906 A1   10/2019
(Continued)

OTHER PUBLICATIONS

The Extended European Search Report dated Dec. 3, 2021 for the related European Patent Application No. 19882291.8.
(Continued)

*Primary Examiner* — Nicholas A Smith
(74) *Attorney, Agent, or Firm* — McDermott Will & Emery LLP

(57) ABSTRACT

An electrochemical hydrogen compressor includes: a cell including a proton conductive electrolyte membrane having a pair of principal surfaces, a cathode disposed on a first one of the principal surfaces of the electrolyte membrane, and an anode disposed on a second one of the principal surfaces of the electrolyte membrane; a voltage applicator that applies a voltage between the anode and the cathode; a dew point adjuster that adjusts a dew point of a hydrogen-containing gas to be supplied to the anode; and a controller that, when the temperature of the cell increases, controls the dew point adjuster to increase the dew point of the hydrogen-containing gas.

11 Claims, 3 Drawing Sheets

(51) Int. Cl.
      *C25B 15/02*      (2021.01)
      *C25B 15/08*      (2006.01)
      *C25B 9/23*       (2021.01)

(56) References Cited

U.S. PATENT DOCUMENTS

2016/0001215 A1\* 1/2016 Vanzandt .................. C01B 3/56
                                                                                     422/162
2019/0368483 A1\* 12/2019 Wakita .................... F04B 43/04
2022/0025529 A1\* 1/2022 Kamata .................... C01B 3/56

FOREIGN PATENT DOCUMENTS

| | | |
|---|---|---|
| EP | 3574978 A1 | 12/2019 |
| EP | 3581681 A2 | 12/2019 |
| EP | 3599656 A1 | 1/2020 |
| JP | 2015-117139 | 6/2015 |

OTHER PUBLICATIONS

International Search Report of PCT application No. PCT/JP2019/036272 dated Oct. 15, 2019.

\* cited by examiner

ELECTROCHEMICAL HYDROGEN COMPRESSOR AND METHOD FOR OPERATING ELECTROCHEMICAL HYDROGEN COMPRESSOR

BACKGROUND

1. Technical Field

The present disclosure relates to an electrochemical hydrogen compressor and to a method for operating the electrochemical hydrogen compressor.

2. Description of the Related Art

From the viewpoint of improving fuel economy and of utilizing carbon-free fuel, fuel cell vehicles that run using electric power generated by fuel cells to drive motors have recently been receiving attention and have been put on the market.

However, a problem in achieving widespread use of the fuel cell vehicles is how to provide an infrastructure for supplying hydrogen used as fuel and how to build hydrogen stations as many as possible over a wide area in the country. In conventional hydrogen stations, pressure swing adsorption (PSA), for example, is used to purify and compress hydrogen. However, the devices for pressure swing adsorption are large and require a huge installation cost, and this impedes nation-wide installation of hydrogen stations.

In the coming hydrogen society, there is a need not only for development of a technique for producing hydrogen but also for development of a technique for storing hydrogen at high density and allowing a small volume of hydrogen to be transported or utilized at low cost. In particular, to facilitate the use of fuel cells used as distributed energy sources, it is necessary to improve the fuel supply infrastructure. To supply hydrogen to the fuel supply infrastructure stably, various proposals for obtaining highly purified hydrogen and boosting the pressure of the hydrogen have been made.

For example, Japanese Unexamined Patent Application Publication No. 2015-117139 discloses a hydrogen purification/pressure boosting system in which a voltage is applied between an anode and a cathode that hold an electrolyte membrane therebetween to thereby purify hydrogen and boost the pressure of the hydrogen. Specifically, when a current flows between the anode and the cathode, hydrogen in the anode is converted to protons, and the protons together with entrained water molecules migrate from the anode to the cathode through the electrolyte membrane and are reconverted to hydrogen in the cathode. A stacked structure including the anode, the electrolyte membrane, and the cathode is hereinafter referred to as a membrane electrode assembly (MEA).

In a hydrogen utilization system for a stationary application, the use of a technology called P2G (Power to Gas) in which hydrogen generated by water electrolysis using surplus power from renewable energy is stored in a hydrogen reservoir allows the system built to address, for example, the time lag between the power obtained from the renewable energy and power demand. In this case, for example, the hydrogen purification/pressure boosting system disclosed in Japanese Unexamined Patent Application Publication No. 2015-117139 may be used to store hydrogen obtained in the water electrolysis device at high presser (e.g., about 20 MPa) in the hydrogen reservoir.

For example, an electrochemical hydrogen compressor may be used to store hydrogen obtained, for example, by reforming town gas in a hydrogen reservoir at high pressure (e.g., about 40 MPa). In this case, the hydrogen reservoir can be used as a hydrogen source for a forklift equipped with a fuel cell.

SUMMARY

In the conventional example, an improvement in the efficiency of the hydrogen compression operation of the electrochemical hydrogen compressor is not studied sufficiently.

One non-limiting and exemplary embodiment provides an electrochemical hydrogen compressor that can perform the hydrogen compression operation with improved efficiency as compared to the conventional example and a method for operating the electrochemical hydrogen compressor.

In one general aspect, the techniques disclosed here feature an electrochemical hydrogen compressor including: a cell including a proton conductive electrolyte membrane having a pair of principal surfaces, a cathode disposed on a first one of the principal surfaces of the electrolyte membrane, and an anode disposed on a second one of the principal surfaces of the electrolyte membrane; a voltage applicator that applies a voltage between the anode and the cathode; a dew point adjuster that adjusts a dew point of a hydrogen-containing gas to be supplied to the anode; and a controller that, when the temperature of the cell increases, controls the dew point adjuster to increase the dew point of the hydrogen-containing gas.

The electrochemical hydrogen compressor in the above aspect of the present disclosure has the effect of improving the efficiency of the hydrogen compression operation as compared to the conventional example.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
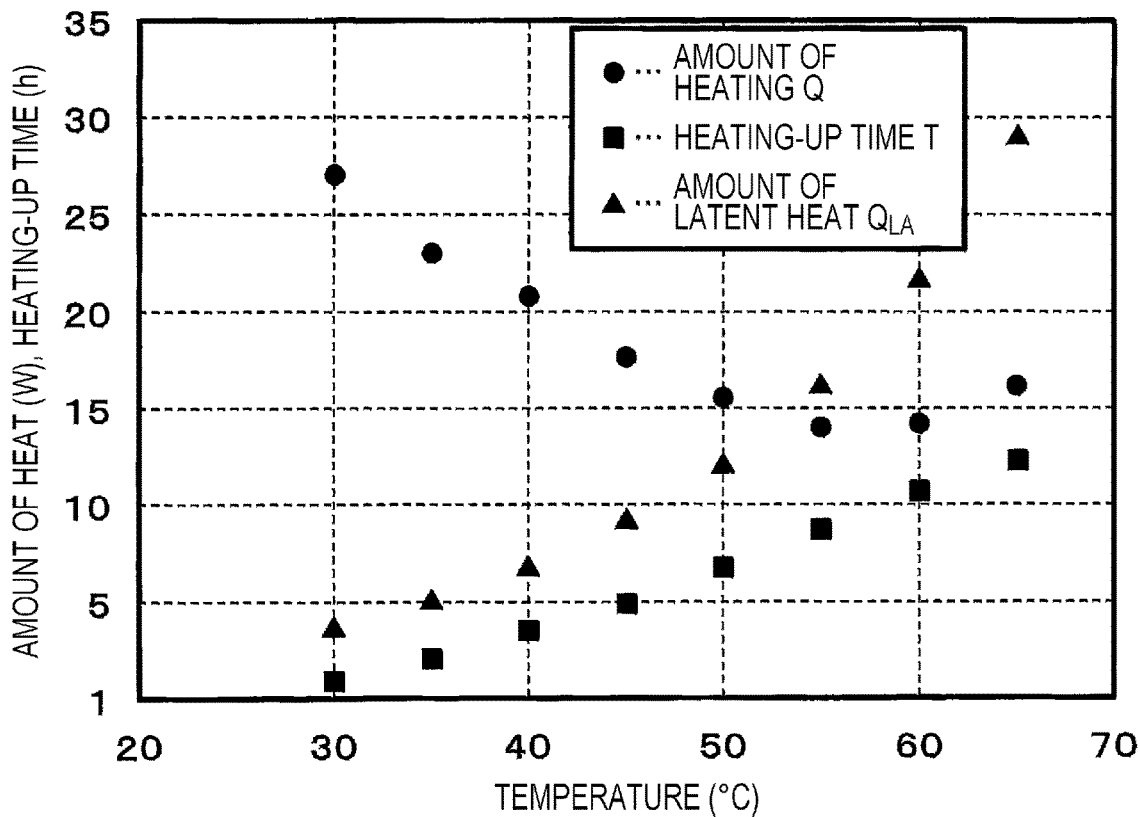
FIG. 1A is a graph showing an example of the results of computations of the amount of heating, heating-up time, and the amount of latent heat in a computation model when the dew point of a hydrogen-containing gas was adjusted.

In an electrochemical hydrogen compressor using a solid polymer electrolyte membrane (hereinafter referred to as an electrolyte membrane), hydrogen ($H_2$) in the anode is converted to protons, and the protons are moved to the cathode. The protons ($H^+$) are reconverted to hydrogen ($H_2$) in the cathode, and the pressure of the hydrogen is thereby increased. Generally, in this case, the proton conductivity of the electrolyte membrane increases under high-temperature/high-humidity conditions (e.g., at about 60° C.), and the efficiency of the hydrogen compression operation of the electrochemical hydrogen compressor thereby increases.

Such an electrochemical hydrogen compressor requires a design that can withstand the pressure of high-pressure gas. Therefore, the MEA is often covered with, for example, a thick highly rigid metal member.

To heat a stack including a plurality of stacked MEAs using, for example, an appropriate heat source, it is necessary to provide desired energy to the heat source. In particular, during the startup of the electrochemical hydrogen compressor, the amount of energy consumed by the heat source is large.

Therefore, extensive studies have been conducted on a technique for heating the MEA while the energy consumed by the heat source is reduced, and the following findings have been obtained.

As for a hydrogen source of the electrochemical hydrogen compressor, for example, a high-humidity hydrogen-containing gas generated by water electrolysis, a high-humidity hydrogen-containing gas generated by a reforming reaction of a hydrocarbon compound, etc. is used as an anode gas of the electrochemical hydrogen compressor. In this case, a high-humidity hydrogen-containing gas having a dew point of about 80° C. is supplied to the anode of the MEA.

In this case, if the dew point of the hydrogen-containing gas is excessively higher than the temperature of the MEA, condensation of water may occur in the MEA, and the water may soak a catalyst in the MEA. Then the condensed water may cause flooding in the anode of the MEA.

In contrast, if the dew point of the hydrogen-containing gas is excessively lower than the temperature of the MEA, it may be difficult to maintain the electrolyte membrane in a wet state necessary for the electrolyte membrane to have high proton conductivity.

Therefore, from the viewpoint of preventing flooding in the anode and from the viewpoint of preventing a reduction in the proton conductivity of the electrolyte membrane, it is important to appropriately adjust the dew point of the hydrogen-containing gas supplied to the anode relative to the temperature of the MEA.

For example, it is desirable that a hydrogen-containing gas having a dew point approximately equal to the temperature of the MEA (full humidification) or slightly higher than the temperature of the MEA is supplied to the anode of the MEA. In this case, as the hydrogen compression operation of the electrochemical hydrogen compressor proceeds, at least part of the hydrogen (protons) in the hydrogen-containing gas present in the anode of the MEA moves to the cathode together with entrained water, and part of water vapor in the hydrogen-containing gas condenses.

Next, condensation of water vapor when the hydrogen in the hydrogen-containing gas present in the anode moves to the cathode while the hydrogen utilization rate is about 70% will be described as an example.

In this example, the amount of hydrogen in the hydrogen-containing gas discharged from the anode is about 30% of the amount of hydrogen in the hydrogen-containing gas supplied to the anode. Suppose that the temperature of the MEA is constant. Then, since the hydrogen-containing gas discharged from the anode is in a fully humidified state, the amount of water vapor in the hydrogen-containing gas discharged from the anode is also about 30% of the amount of water vapor in the hydrogen-containing gas supplied to the anode. A remaining part of the water vapor is discharged from the anode as condensed water or moves from the anode to the cathode together with the protons as electroosmotic water. Suppose that the cathode is sealed. Then, when the temperature is constant, the amount of saturated vapor that can be present in the cathode is constant, so that surplus water vapor exceeding the amount of saturated water vapor condenses. Specifically, it may be considered that about 70% of the amount of water vapor in the hydrogen-containing gas supplied to the anode is condensed in the MEA.

When condensation of water vapor occurs in the anode and the cathode, the latent heat generated during water vapor condensation can be used to increase the temperature of the MEA. Moreover, when the hydrogen compression operation is performed in the electrochemical hydrogen compressor, heat generated by IR loss according to the current flowing through the electrolyte membrane can also be used to increase the temperature of the MEA.

Therefore, whether the temperature of the MEA can be increased appropriately by using the latent heat generated during water vapor condensation and the heat generated by IR loss was examined.

A heat balance simulation from the temperature at the startup of the electrochemical hydrogen compressor (for example, 25° C.) to a prescribed temperature (for example, 65° C.) is unsteady analysis. Therefore, it is often difficult to perform a numerical analysis simulation using a computational model that accurately reproduces the electrochemical hydrogen compressor.

In the following, whether the temperature of the MEA can be increased was examined using a simplified heat balance computation. Specifically, the computational model used was assumed to include an electrode stack having a height of 150 mm and including catalyst layers having a diameter of 67 mm (the electrode stack corresponds to a stack including 11 sets of electrodes and having a height of 150 mm), the electrodes being covered with a SUS316-made hollow cylindrical body having a thickness of 75 mm. Even when such a simple computational model is used, it may be possible to know an approximate heat balance of the electrochemical hydrogen compressor.

<Derivation of Amount of Heat Dissipation and Outer Surface Temperature>

Hereinafter, a heat dissipation computation in the computational model and derivation of the outer surface temperature $T_{SUR}$ of the computational model will be described.

First, the computational model was used to derive the amount of heat dissipation. At this time, to simplify the computation, only heat dissipation from the side surface of the cylinder was taken into consideration, and heat dissipation from the upper and lower surfaces of the cylinder was neglected.

As for temperature conditions, the temperature of the electrodes was assumed to be 30° C., and the ambient temperature was assumed to be 25° C.

As for physical conditions, 5.67×10$^{-8}$ W/m$^2$·K$^4$ was used as the Stefan-Boltzmann constant, and 16.7 W/m·K was used as the thermal conductivity of SUS316. Moreover, 7.5 W/m$^2$·K was used as the convective heat transfer coefficient of SUS316 when no air cooling was performed, and 0.5 was used as the emissivity of the surface of SUS316.

Then, under the above temperature and physical conditions, the amount of convective heat dissipation and the amount of radiant heat dissipation in the computational model were derived, and the outer surface temperature $T_{SUR}$ of the computational model (the temperature of the outer side surface of the hollow cylindrical body) when the sum of the amount of convective heat dissipation and the amount of radiant heat dissipation (hereinafter referred to as the amount of heat dissipation $Q_{RA}$) was equal to the amount of heat passing through the computational model) was derived.

<Derivation of Amount of Heating Usable for Heating Computational Model>

In this computation, the amount of latent heat $Q_{LA}$ generated during condensation of water vapor was derived on the assumption that, when a hydrogen-containing gas (fully humidified gas) having a dew point of 30° C. was supplied to the computational model, a current flowed through the electrodes having a total area of 396 cm$^2$ such that the current density was 1 A/cm$^2$ and that, since the hydrogen utilization rate was 70%, 70% of water vapor in the hydrogen-containing gas condensed. Then the amount of heat $Q_{IR}$ generated by IR loss was added to the amount of latent heat $Q_{LA}$ to derive a total heat amount $Q_T$ (=$Q_{LA}$+$Q_{IR}$). In the above heat amount computation, the difference in the amount of heat of the hydrogen-containing gas between inflow and outflow of the hydrogen-containing gas was considered to be zero and was neglected.

By subtracting the amount of heat dissipation $Q_{RA}$ from the total amount of heat $Q_T$, the amount of heating Q usable for heating the computational model can be determined (formula (1)).

$$Q=Q_T-Q_{RA}=Q_{LA}+Q_{IR}-Q_{RA} \quad (1)$$

<Derivation of Heating-Up Time>

Next, the derivation of the heating-up time of the computational model will be described.

First, the heat capacity C of the computational model when the stack was disposed in the hollow cylinder was derived from the ratio of the materials forming the stack.

Then the heating-up time T required for the electrodes to increase the temperature of the computational model from 25° C. to 30° C. was derived based on this heat capacity C. Specifically, the heating-up time T can be known from the heat capacity C and the amount of heating Q (the amount of heating Q is a function of time) usable for heating the computational model. The coefficient of heat transfer was roughly estimated, and the validity of the computation was checked.

Next, the same computation as that described above was performed except that the temperature of the electrodes was set to 35° C., that the ambient temperature was set to 25° C., and that a hydrogen-containing gas having a dew point of 35° C. was supplied to the computational model.

The temperature of the electrodes and the dew point of the hydrogen-containing gas were increased in steps of 5° C., and the amount of heat dissipation $Q_{RA}$, the amount of heat $Q_{IR}$ generated by IR loss, the amount of latent heat $Q_{LA}$, and the heating-up time T were derived at temperatures of 30° C., 35° C., . . . , 65° C. until the temperature reached 65° C.

FIG. 1A is a graph showing an example of the results of the computations of the amount of heating, the heating-up time, and the amount of latent heat in the computational model when the dew point of the hydrogen-containing gas was adjusted. Specifically, the temperature of the electrodes and the dew point of the hydrogen-containing gas were increased in steps of 5° C., and the amount of heating Q (black circles), the amount of latent heat $Q_{LA}$ (black triangles), and the heating-up time T (black squares) were determined at 30° C., 35° C., . . . , 65° C. until the temperature reached 65° C. and plotted in FIG. 1A. The numerical values on the horizontal axis of FIG. 1A represent the temperature (° C.) of the electrodes, and the numerical values on the vertical axis of FIG. 1A represent the time (h) and the amount of heat (W).

As can be seen from FIG. 1A, in the entire electrode temperature range of from 30° C. to 65° C., the amount of heating Q is positive. Specifically, the total amount of heat $Q_T$ obtained by adding the amount of heat $Q_{IR}$ generated by IR loss to the amount of latent heat $Q_{LA}$ is larger than the amount of heat dissipation $Q_{RA}$ ($Q_T$>$Q_{RA}$) over the entire electrode temperature range of from 30° C. to 65° C. Therefore, it was verified that the computational model can be appropriately heated by the latent heat generated during condensation of water vapor and the heat generated by IR loss.

Comparative Example

The same computation as that described above was performed as a comparative example except that the dew point of the hydrogen-containing gas was fixed at 30° C.

Figure 1B:
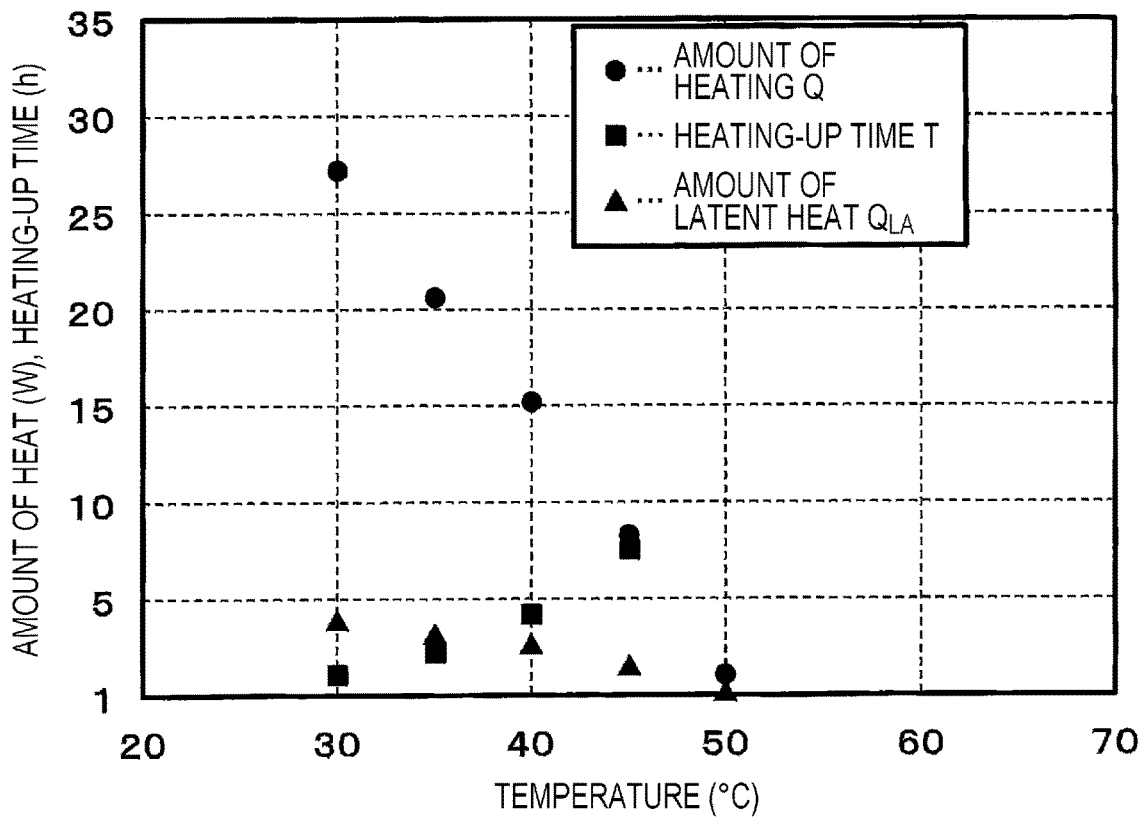
FIG. 1B is a graph showing an example of the results of computations of the amount of heating, the heating-up time, and the amount of latent heat in the computation model when the dew point of the hydrogen-containing gas was fixed.

FIG. 1B is a graph showing an example of the results of computations of the amount of heating, the heating-up time, and the amount of latent heat in the computation model when the dew point of the hydrogen-containing gas was fixed. Specifically, the temperature of the electrodes was increased in steps of 5° C. while the dew point of the hydrogen-containing gas was fixed, and the amount of heating Q (black circles), the amount of latent heat $Q_{LA}$ (black triangles), and the heating-up time T (black squares) were determined at 30° C., 35° C., . . . , 65° C. until the temperature reached 65° C. and plotted in FIG. 1B. The numerical values on the horizontal axis of FIG. 1B represent the temperature (° C.) of the electrodes, and the numerical values on the vertical axis of FIG. 1B represent the time (h) and the amount of heat (W).

As can be seen from FIG. 1B, when the temperature of the electrodes exceeds about 50° C., the amount of heating Q becomes negative. Specifically, when the temperature of the electrodes exceeds about 50° C., the total amount of heat $Q_T$ obtained by adding the amount of heat QTR generated by IR loss to the amount of latent heat $Q_{LA}$ is lower than the amount of heat dissipation $Q_{RA}$ ($Q_T$<$Q_{RA}$). Therefore, in the electrode temperature range exceeding about 50° C., it may be difficult to heat the computational model using the latent heat generated during condensation of water vapor and the heat generated by IR loss. When a low-humidity hydrogen-containing gas is used for the hydrogen compression operation of the electrochemical hydrogen compressor at high temperature, drying up of the electrolyte membrane may occur. Therefore, in practice, it may be necessary to control the temperature of the electrodes to about 40° C.

In consideration of the fact that the proton conductivity of the electrolyte membrane increases under high temperature and high humidity conditions and the efficiency of the hydrogen compression operation of the electrochemical hydrogen compressor is thereby improved, the above computational results clearly show the technological significance of the control of the dew point of the hydrogen-containing gas.

As described above, the present inventors have found that, by using the latent heat generated during condensation of water vapor and the heat generated by IR loss to heat the MEA, the MEA can be heated to an appropriate temperature while the energy consumption of the heat source is reduced. The inventors have thereby arrived at the following aspects of the present disclosure.

Accordingly, an electrochemical hydrogen compressor in a first aspect of the present disclosure includes: a cell including a proton conductive electrolyte membrane having a pair of principal surfaces, a cathode disposed on a first one of the principal surfaces of the electrolyte membrane, and an anode disposed on a second one of the principal surfaces of the electrolyte membrane; a voltage applicator that applies a voltage between the anode and the cathode; a dew point adjuster that adjusts a dew point of a hydrogen-containing gas to be supplied to the anode; and a controller that, when the temperature of the cell increases, controls the dew point adjuster to increase the dew point of the hydrogen-containing gas.

The electrochemical hydrogen compressor in the present aspect having the structure described above can have higher hydrogen compression operation efficiency than conventional electrochemical hydrogen compressors. Specifically, since the latent heat generated during condensation of water vapor and the heat generated by IR loss can be used to heat the cell of the electrochemical hydrogen compressor, the temperature of the electrochemical hydrogen compressor can be increased to a desired temperature efficiently.

Suppose that the dew point of the hydrogen-containing gas to be supplied to the anode is constant. Then, when the temperature of the cell of the electrochemical hydrogen compressor increases, the proton conductivity of the electrolyte membrane decreases because the relative humidity in the cell decreases as the temperature of the cell increases. In this case, the voltage necessary for the hydrogen compression operation of the electrochemical hydrogen compressor increases, and there is the possibility that the efficiency of the hydrogen compression operation of the electrochemical hydrogen compressor may decrease.

However, in the electrochemical hydrogen compressor in the present aspect, the dew point adjuster increases the dew point of the hydrogen-containing gas to be supplied to the anode when the temperature of the cell increases, so that the above possibility can be reduced.

In the electrochemical hydrogen compressor in the present aspect, the ratio of condensed water produced by condensation of water vapor in the hydrogen-containing gas is maintained at a high value even when the temperature of the cell increases. Therefore, the electrochemical hydrogen compressor in the present aspect can effectively utilize the latent heat generated during condensation of water vapor to heat the cell of the electrochemical hydrogen compressor even when the temperature of the cell increases.

An electrochemical hydrogen compressor in a second aspect of the present disclosure is the electrochemical hydrogen compressor in the first aspect, wherein, at startup, the controller may control the dew point adjuster such that a humidified hydrogen-containing gas is supplied to the anode.

Since the electrochemical hydrogen compressor requires a design that can withstand the pressure of high-pressure gas, the cell is often covered with, for example, a thick highly rigid metal member. Therefore, once the temperature of the electrochemical hydrogen compressor increases, the electrochemical hydrogen compressor is not easily cooled because the heat capacity of the electrochemical hydrogen compressor is high. However, at the startup of the electrochemical hydrogen compressor, the temperature of the cell is usually room temperature. Therefore, in this case, it is necessary to perform an operation that increases the temperature of the cell of the electrochemical hydrogen compressor.

Accordingly, in the electrochemical hydrogen compressor in the present aspect, the humidified hydrogen-containing gas is supplied to the anode at the startup, and therefore heating of the cell using the latent heat generated during condensation of water vapor can be effectively used at the startup.

An electrochemical hydrogen compressor in a third aspect of the present disclosure is the electrochemical hydrogen compressor in the first or second aspect, wherein the controller may control the voltage applicator such that a part of hydrogen in the hydrogen-containing gas supplied to the anode is compressed and a remaining part of the hydrogen is not compressed.

If the entire amount of the hydrogen in the hydrogen-containing gas is compressed from the anode of the cell to the cathode, an excessively large amount of condensed water may dwell in the anode, and flooding may occur in the anode. In this case, the diffusion overvoltage of the cell of the electrochemical hydrogen compressor may increase.

In the electrochemical hydrogen compressor in the present aspect, part of the hydrogen in the hydrogen-containing gas supplied to the anode is recycled as described in the above control, and the condensed water dwelling in the anode can be discharged to the outside of the anode through the action of the flow of the hydrogen-containing gas. Therefore, in the electrochemical hydrogen compressor in the present aspect, the possibility of the occurrence of flooding in the anode can be lower than that when the entire amount of the hydrogen in the hydrogen-containing gas is compressed from the anode of the cell to the cathode.

As the hydrogen compression operation of the electrochemical hydrogen compressor proceeds, the amount of heat generated in the cell by IR loss increases. In this case, it is necessary to control the hydrogen compression operation such that the temperature of the cell is not excessively increased.

Therefore, the above simple computational model was used to verify whether the temperature of the cell of the electrochemical hydrogen compressor can be controlled by air cooling.

Specifically, the temperature of the electrodes of the computational model was set to 65° C., and the ambient temperature was set to 25° C. The amount of heating Q when a hydrogen-containing gas (fully humidified gas) having a dew point of 65° C. was supplied to the computational model was derived under the same conditions as above. Then the convective heat transfer coefficient of SUS316 when the amount of heating Q was equal to the amount of heat dissipation $Q_{RA}$ ($Q=Q_{RA}$) was derived and found to be 12 W/m²K. In consideration of the fact that the convective heat transfer coefficient of SUS316 during forced air cooling is about 7.5 to about 100 W/m²K, the above numerical value means that the temperature of the cell of the electrochemical hydrogen compressor can be controlled sufficiently by air cooling.

Accordingly, an electrochemical hydrogen compressor in a fourth aspect of the present disclosure is the electrochemical hydrogen compressor in any one of the first to third aspects and may further include a cooler that cools the cell, and the controller may actuate the cooler when the amount of heat generated in the cell increases.

When an air cooler is used as the cooler, the temperature of the cell of the electrochemical hydrogen compressor can be controlled more easily than when cooling water, for example, is caused to flow through the cell.

An electrochemical hydrogen compressor in a fifth aspect of the present disclosure is the electrochemical hydrogen compressor in any one of the first to fourth aspects, wherein the hydrogen-containing gas may contain a hydrogen-containing gas generated by water electrolysis.

The hydrogen-containing gas generated by water electrolysis contains water vapor. For example, the hydrogen-containing gas generated by water electrolysis is in a high-humidity state with a dew point of about 80° C. Therefore, the electrochemical hydrogen compressor in the present aspect can desirably use the hydrogen-containing gas generated by water electrolysis as the hydrogen-containing gas to be supplied to the anode.

An electrochemical hydrogen compressor in a sixth aspect of the present disclosure is the electrochemical hydrogen compressor in any one of the first to fifth aspects, wherein the hydrogen-containing gas may contain a hydrogen-containing gas generated by a reforming reaction of a hydrocarbon compound.

The hydrogen-containing gas generated by the reforming reaction of the hydrocarbon compound contains water vapor. For example, the hydrogen-containing gas generated by the reforming reaction of the hydrocarbon compound is in a high-humidity state with a dew point of about 80° C. Therefore, the electrochemical hydrogen compressor in the present aspect can desirably use the hydrogen-containing gas generated by the reforming reaction of the hydrocarbon compound as the hydrogen-containing gas to be supplied to the anode.

An electrochemical hydrogen compressor in a seventh aspect of the present disclosure is the electrochemical hydrogen compressor in any one of the first to sixth aspects, wherein the dew point adjuster may include a condenser, and wherein, when the temperature of the cell increases, the controller may control the condenser to reduce the amount of water condensed from the hydrogen-containing gas to be supplied to the anode.

In the electrochemical hydrogen compressor in the present aspect having the structure described above, the amount of water condensed from the hydrogen-containing gas is reduced in the condenser when the temperature of the cell increases, and the dew point of the hydrogen-containing gas to be supplied to the anode can thereby be increased appropriately.

For example, by bringing the dew point of the hydrogen-containing gas close to the temperature of the cell by increasing or decreasing the amount of water condensed in the condenser, the occurrence of flooding in the anode and drying up of the electrolyte membrane can be prevented while the latent heat generated during condensation of water vapor in the cell is effectively used to heat the cell. Desirably, in this case, the hydrogen-containing gas supplied to the anode of the cell has a dew point approximately equal to or slightly higher than the temperature of the cell.

An electrochemical hydrogen compressor in an eighth aspect of the present disclosure is the electrochemical hydrogen compressor in any one of the first to sixth aspects, wherein the dew point adjuster may include a humidifier, and wherein, when the temperature of the cell increases, the controller may control the humidifier to increase the humidity of the hydrogen-containing gas to be supplied to the anode.

In the electrochemical hydrogen compressor in the present aspect having the structure described above, by increasing the humidity of the hydrogen-containing gas in the humidifier when the temperature of the cell increases, the dew point of the hydrogen-containing gas to be supplied to the anode can be increased appropriately.

For example, by bringing the dew point of the hydrogen-containing gas close to the temperature of the cell by increasing or decreasing the humidity adjusted by the humidifier, the occurrence of flooding in the anode and drying up of the electrolyte membrane can be prevented while the latent heat generated during condensation of water vapor in the cell is effectively used to heat the cell. In this case, it is desirable that the hydrogen-containing gas supplied to the anode of the cell has a dew point approximately equal to or slightly higher than the temperature of the cell.

An electrochemical hydrogen compressor in a ninth aspect of the present disclosure is the electrochemical hydrogen compressor in any one of the first to eighth aspects, wherein the controller may control the dew point adjuster to adjust the dew point of the hydrogen-containing gas to be equal to or lower than the temperature of the cell +5° C., and wherein, when the temperature of the cell increases, the controller controls the dew point adjuster to increase the dew point of the hydrogen-containing gas.

In this structure, flooding in the cell can be prevented effectively, and stable startup can be achieved.

An electrochemical hydrogen compressor in a tenth aspect of the present disclosure is the electrochemical hydrogen compressor in any one of the first to eighth aspects, wherein the controller may control the dew point adjuster to adjust the dew point of the hydrogen-containing gas to be equal to or lower than the temperature of the cell, and wherein, when the temperature of the cell increases, the controller may control the dew point adjuster to increase the dew point of the hydrogen-containing gas.

In this structure, flooding in the cell can be prevented effectively, and more stable startup can be achieved.

An electrochemical hydrogen compressor operating method in an eleventh aspect includes: (a) applying a voltage between an anode of a cell and a cathode of the cell to supply a compressed hydrogen gas from the anode to the cathode, the cell including a proton conductive electrolyte membrane having a pair of principal surfaces, the cathode disposed on a first one of the principal surfaces of the electrolyte membrane, and the anode disposed on a second one of the principal surfaces of the electrolyte membrane; and (b), when the temperature of the cell increases in (a), increasing the dew point of a hydrogen-containing gas to be supplied to the anode.

In the above-described electrochemical hydrogen compressor operating method in the present aspect, the efficiency of the hydrogen compression operation can be higher than that in conventional methods. The operational advantages of the electrochemical hydrogen compressor operating method in the present aspect are the same as the operational advantages of the electrochemical hydrogen compressor in the first aspect, and their detailed description will be omitted.

An embodiment of the present disclosure will be described with reference to the drawings. The embodiment described below shows examples of the above aspects. Therefore, shapes, materials, components, arrangements and connections of the components, etc. shown in the following embodiment do not limit the aspects described above, unless these features are stated in the claims. Among the components in the following description, components not stated in the independent claim defining the broadest concept of the aspects are described as optional components. Description of components with the same reference symbols in the drawings may be omitted as appropriate. The drawings illustrate components schematically for the sake of facilitating understanding, and their shapes, dimension ratio, etc. may not be accurately illustrated.

Embodiment

[Structure of Electrochemical Hydrogen Compressor]

Figure 2A:
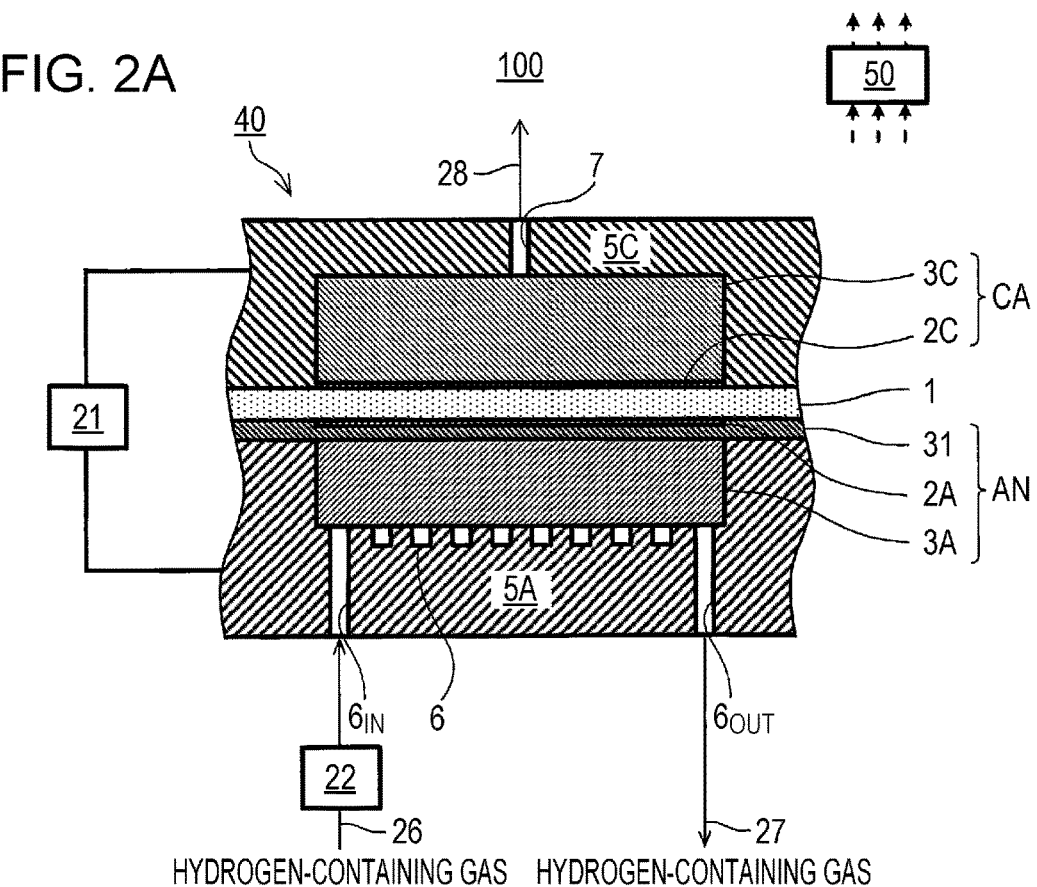
FIG. 2A is an illustration showing an example of an electrochemical hydrogen compressor in an embodiment.
Figure 2B:
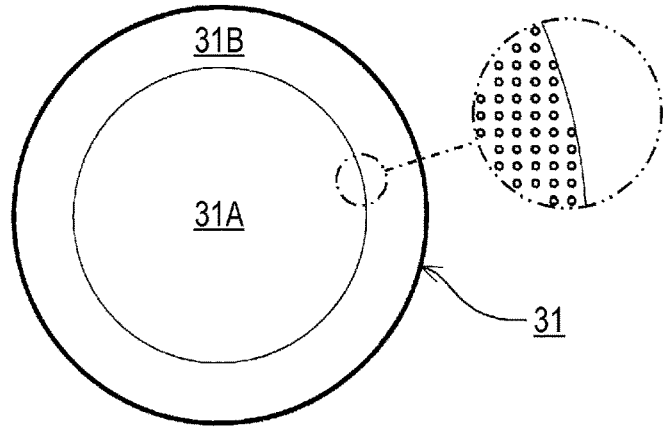
FIG. 2B is an illustration showing the example of the electrochemical hydrogen compressor in the embodiment.

FIGS. 2A and 2B are illustrations showing an example of an electrochemical hydrogen compressor in the embodiment. FIG. 2B is a plan view of an anode gas diffuser plate 31 of the electrochemical hydrogen compressor 100.

In the example shown in FIGS. 2A and 2B, the electrochemical hydrogen compressor 100 includes a cell 40, a voltage applicator 21, a dew point adjuster 22, and a controller 50. The cell 40 of the electrochemical hydrogen compressor 100 includes an electrolyte membrane 1, an anode AN, a cathode CA, a cathode separator 5C, and an anode separator 5A.

The electrolyte membrane 1 is a membrane having a pair of principal surfaces and having proton (H+) conductivity. The electrolyte membrane 1 may have any structure so long as it has proton conductivity. Examples of the electrolyte membrane 1 include a fluorine-based polymer electrolyte membrane and a hydrocarbon-based electrolyte membrane. Specific examples of the electrolyte membrane 1 include, but not limited to, Nafion (registered trademark, manufactured by DuPont) and Aciplex (registered trademark, manufactured by Asahi Kasei Corporation).

The cathode CA is disposed on a first one of the principal surfaces of the electrolyte membrane 1. The anode AN is disposed on a second one of the principal surfaces of the electrolyte membrane 1.

As shown in FIG. 2A, the anode AN includes the anode gas diffuser plate 31, an anode catalyst layer 2A, and an anode gas diffusion layer 3A. The cathode CA includes a cathode catalyst layer 2C and a cathode gas diffusion layer 3C.

The cathode catalyst layer 2C is disposed on the first one of the principal surfaces of the electrolyte membrane 1. The cathode catalyst layer 2C may contain, for example, Pt as a catalyst metal, but this is not a limitation. Although not shown in FIGS. 2A and 2B, a sealing member is disposed so as to surround the cathode catalyst layer 2C in plan view, and the hydrogen-containing gas in the cathode CA is appropriately sealed in by the sealing member.

The anode catalyst layer 2A is disposed on the second one of the principal surfaces of the electrolyte membrane 1. The anode catalyst layer 2A may contain, for example, platinum (Pt) as a catalyst metal, but this is not a limitation. Although not shown in FIGS. 2A and 2B, a sealing member is disposed so as to surround the anode catalyst layer 2A in plan view, and the hydrogen-containing gas in the anode AN is appropriately sealed in by the sealing member.

Any of various catalyst preparation methods may be used for the cathode catalyst layer 2C and the anode catalyst layer 2A, and no particular limitation is imposed on the catalyst preparation method. Examples of carriers of the catalysts include electrically conductive oxide powders and carbon-based powders. Examples of the carbon-based powder include graphite powder, carbon black powder, and electrically conductive activated carbon powder. No particular limitation is imposed on the method for supporting platinum or another catalyst metal on a carrier such as carbon. For example, a method such as powder mixing or liquid phase mixing may be used. Examples of the liquid phase mixing include a method in which a carrier such as carbon is dispersed in a catalyst component colloidal solution so that the catalyst component adsorbs on the carrier. No particular limitation is imposed on the supporting state of the catalyst metal such as platinum supported on the carrier. For example, the catalyst metal may be formed into fine particles, and the fine particles may be highly dispersed and supported on the carrier.

The anode gas diffusion layer 3A is disposed on the anode catalyst layer 2A through the anode gas diffuser plate 31. The anode gas diffusion layer 3A is formed of, for example, a porous material and has corrosion resistance, electrical conductivity, and gas diffusibility. Desirably, the anode gas diffusion layer 3A is formed of a highly rigid material that can prevent the displacement and deformation of components caused by the differential pressure between the anode AN and the cathode CA during the hydrogen compression operation of the electrochemical hydrogen compressor 100.

The anode separator 5A is disposed so as to cover a first principal surface of the anode gas diffusion layer 3A and its side surface. Specifically, the anode gas diffusion layer 3A is housed in a recess in a central portion of the anode separator 5A. An anode flow channel 6 having, for example, a serpentine shape is formed on a principal surface of the anode separator 5A that is in contact with the anode gas diffusion layer 3A. Therefore, the hydrogen-containing gas flowing from the outside through an anode gas introduction channel 26 into an anode inlet $6_{IN}$ passes through the anode flow channel 6 disposed between the anode inlet $6_{IN}$ and an anode outlet $6_{OUT}$. In this case, part of the hydrogen-containing gas flowing through the anode flow channel 6 is supplied to the anode gas diffusion layer 3A. The hydrogen-containing gas passing through the anode outlet $6_{OUT}$ is discharged to the outside through an anode gas discharge channel 27.

The anode flow channel 6 may be formed by forming a slit hole having the serpentine shape in a plate member different from the anode separator 5A and joining them integrally or may be formed by forming a channel groove having the serpentine shape on the principal surface of the anode separator 5A. The anode flow channel 6 is not necessarily formed as a flow channel having a serpentine shape. The anode flow channel 6 may be composed of a plurality of linear flow channels.

The anode separator 5A is formed from, for example, a metal member and has corrosion resistance and electrical conductivity. For example, titanium plated with platinum may be used as the material of the anode separator 5A.

As shown in FIGS. 2A and 2B, the electrochemical hydrogen compressor 100 may include the anode gas diffuser plate 31 having a circular shape.

The anode gas diffusion plate 31 includes: a circular central portion 31A in contact with a second principal surface of the anode gas diffusion layer 3A and with the anode catalyst layer 2A; and a circular annular circumferential portion 31B in contact with the anode separator 5A and with the electrolyte membrane 1.

As shown in FIG. 2B, a plurality of vent holes are formed in the central portion 31A of the anode gas diffuser plate 31. Therefore, the hydrogen-containing gas can pass between the anode catalyst layer 2A and the anode gas diffusion layer 3A through the vent holes. The vent holes may be, for example, openings having a size of several tens of micrometers and evenly spaced at intervals of several tens of micrometers, but the size of the vent holes and the intervals therebetween are not limited thereto. These vent holes can be formed by, for example, laser processing.

In contrast, no vent holes are formed in the circumferential portion 31B of the anode gas diffuser plate 31, and the circumferential portion 31B is flat.

The anode gas diffuser plate 31 is formed from, for example, a metal plate and has corrosion resistance and electrical conductivity. For example, a titanium plate plated with platinum may be used for the anode gas diffuser plate 31.

An unillustrated circular annular sealing member is disposed on the circumferential portion 31B (flat portion) of the anode gas diffuser plate 31 through the electrolyte membrane 1. Therefore, the electrolyte membrane 1 is pressed by the sealing member against the circumferential portion 31B of the anode gas diffuser plate 31. The sealing member used may be, for example, an O-ring.

The anode gas diffuser plate 31 and the sealing member are merely examples, and these examples are not limitations. For example, the anode gas diffuser plate 31 is formed from a circular plate, but this is not a limitation. When the anode gas diffusion layer 3A has, for example, a rectangular shape in plan view, the anode gas diffuser plate 31 may have a rectangular shape in plan view, and the sealing member may have a rectangular ring shape in plan view.

The cathode gas diffusion layer 3C is disposed on the cathode catalyst layer 2C. The cathode gas diffusion layer 3C is formed from, for example, a porous body and has corrosion resistance, electrical conductivity, and gas diffusibility. For example, the cathode gas diffusion layer 3C may be formed from a porous body, such as sintered titanium fibers plated with platinum, which has corrosion resistance and electrical conductivity. Desirably, the cathode gas diffusion layer 3C is formed of an elastic material that resists bucking and can follow the displacement and deformation of components caused by the differential pressure between the anode AN and the cathode CA during the hydrogen compression operation of the electrochemical hydrogen compressor 100.

The cathode separator 5C is disposed so as to cover a principal surface of the cathode gas diffusion layer 3C and its side surface. Specifically, the cathode gas diffusion layer 3C is housed in a recess in a central portion of the cathode separator 5C. A cathode flow channel 7 for discharging the high-pressure hydrogen-containing gas present in the cathode gas diffusion layer 3C to the outside through a cathode gas discharge channel 28 is disposed in an appropriate portion of the cathode separator 5C. The number of cathode flow channels 7 may be one as shown in FIG. 2A or two or more.

The cathode separator 5C is formed from, for example, a metal member and has corrosion resistance and electrical conductivity. For example, titanium plated with platinum may be used as the material of the cathode separator 5C. The outer circumferential portion of the cathode separator 5C is in contact with the electrolyte membrane 1. A circular annular groove may be formed in an appropriate portion of the outer circumferential portion, and the sealing member may be fitted into the circular annular groove.

The cathode separator 5C may have a closed-end circular cylindrical shape or a closed-end rectangular cylindrical shape. When the cathode separator 5C is formed from a circular cylindrical body, the cathode separator 5C can have higher resistance to gas pressure than a cathode separator 5C formed from a rectangular cylindrical body.

The voltage applicator 21 is a device that applies a voltage between the anode AN and the cathode CA. The voltage applicator 21 may have any structure so long as a voltage can be applied between the anode AN and the cathode CA. In the example shown in FIG. 2A, a high potential-side terminal of the voltage applicator 21 is connected to the anode AN, and a low potential-side terminal of the voltage applicator 21 is connected to the cathode CA. In this manner, the voltage applicator 21 is used to cause a current to flow between the anode AN and the cathode CA.

Examples of the voltage applicator 21 include a DC/DC converter and an AC/DC converter. The DC/DC converter is used when the voltage applicator 21 is connected to a DC power source such as a solar cell, a fuel cell, or a battery. The AC/DC converter is used when the voltage applicator 21 is connected to an AC power source such as a commercial power supply.

The voltage applicator 21 may be, for example, an electric power-type power supply in which the voltage applied between the anode AN and the cathode CA and the current flowing between the anode AN and the cathode CA are adjusted such that the power supplied to the electrochemical hydrogen compressor 100 is controlled to a prescribed set value.

The dew point adjuster 22 is a device that adjusts a dew point of the hydrogen-containing gas to be supplied to the anode AN. Specifically, the dew point adjuster 22 is disposed in the anode gas introduction channel 26 for guiding the hydrogen-containing gas to the anode inlet $6_{IN}$.

The dew point adjuster 22 may have any structure so long as the dew point of the hydrogen-containing gas to be supplied to the anode AN can be adjusted. Examples of the dew point adjuster 22 include a humidifier that humidifies the hydrogen-containing gas and a condenser that condenses water vapor in the hydrogen-containing gas.

The dew point adjustment by the humidifier is performed, for example, by adjusting the humidity using the humidifier or adjusting the ratio of the amount of the hydrogen-containing gas passing through the humidifier to the amount of the hydrogen-containing gas bypassing the humidifier. The adjustment of the humidity using the humidifier is performed by adjusting the amount of heating by a heater provided in the humidifier, adjusting the amount of water supplied to the humidifier, or adjusting the amount of humidified gas supplied to the humidifier. The hydrogen-containing gas that has bypassed the humidifier merges with the hydrogen-containing gas that has passed through the humidifier before introduction into the anode AN.

The dew point adjustment by the condenser is performed, for example, by adjusting the amount of condensation using the condenser or adjusting the ratio of the amount of the hydrogen-containing gas passing through the condenser to the amount of the hydrogen-containing gas bypassing the condenser. The amount of condensation by the condenser is adjusted by adjusting the amount of cooling by a cooler provided in the condenser.

The details of the condenser and the humidifier will be described in Examples.

When the temperature of the cell 40 of the electrochemical hydrogen compressor 100 increases, the controller 50 controls the dew point adjuster 22 to increase the dew point of the hydrogen-containing gas to be supplied to the anode AN. For example, during startup, the controller 50 may control the dew point adjuster 22 such that a humidified hydrogen-containing gas is supplied to the anode AN.

In the above control, the electrochemical hydrogen compressor 100 may be provided with an unillustrated detector that detects the temperature of the cell 40. Examples of the detector include, but not limited to, a thermocouple.

The controller 50 includes, for example, an arithmetic circuit (not shown) and a storage circuit (not shown) that stores a control program. Examples of the arithmetic circuit include an MPU and a CPU. Examples of the storage circuit include a memory. The controller 50 may be composed of a single controller that performs centralized control or may be composed of a plurality of controllers that cooperate to perform distributed control.

Although not shown in FIGS. 2A and 2B, components necessary for the hydrogen compression operation of the electrochemical hydrogen compressor 100 in the present embodiment are provided as appropriate.

For example, the electrochemical hydrogen compressor 100 may be prepared as follows. A stack of about 10 to about 200 cells 40 each including the MEA, the anode separator 5A, and the cathode separator 5C is formed. The stack is sandwiched between end plates through current collectors and insulating plates, and the end plates are fastened with, for example, fastening rods. The number of cells 40 may be set to an appropriate number according to the operating conditions of the electrochemical hydrogen compressor 100. Sealing members such as O-rings or gaskets may be provided on both sides of each MEA in order to prevent the high-pressure gas from leaking from the electrochemical hydrogen compressor to the outside, and the sealing members and the MEA may be integrated with each other in advance. The electrically conductive anode separators 5A and the electrically conductive cathode separators 5C are disposed outside the respective MEAs. These separators are used to electrically connect respective adjacent MEAs in series and mechanically fix the MEAs.

The electrochemical hydrogen compressor 100 in the present embodiment may not include a heater for heating the cell 40 or may include the heater (not shown). The heater may be an electric heater or a flow channel through which a heating fluid flows.

The above-described unillustrated components are merely examples, and these examples are not limitations.

[Structure of Hydrogen Supply System]

A description will next be given of a hydrogen supply system 200 including the electrochemical hydrogen compressor 100.

Figure 3:
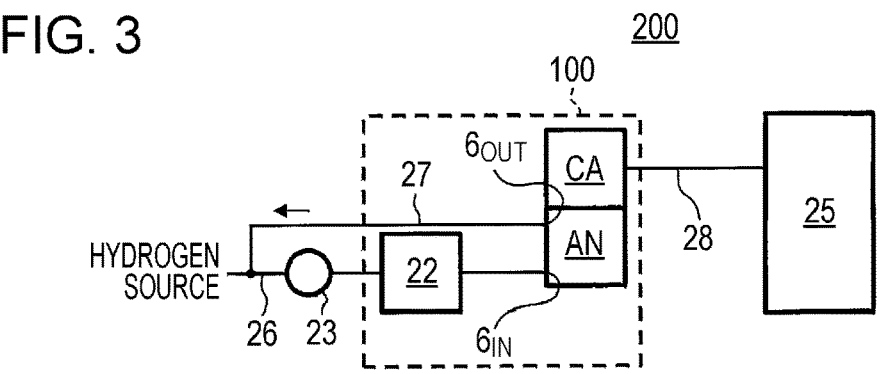
FIG. 3 is an illustration showing an example of a hydrogen supply system including the electrochemical hydrogen compressor in the embodiment.

FIG. 3 is an illustration showing an example of the hydrogen supply system including the electrochemical hydrogen compressor in the embodiment.

In the example shown in FIG. 3, the hydrogen supply system 200 includes the electrochemical hydrogen compressor 100, a gas supply 23, and a hydrogen reservoir 25. In FIG. 3, the illustration of the cell 40 of the electrochemical hydrogen compressor 100 in FIG. 2A is simplified, and the illustration of the voltage applicator 21 is omitted for the sake of convenience.

In the example shown in FIG. 3, the dew point adjuster 22 of the electrochemical hydrogen compressor 100 in FIG. 2A is configured to adjust the dew point of a hydrogen-containing gas (gas mixture) that is a mixture of a hydrogen-containing gas discharged from the anode outlet $6_{OUT}$ through the anode gas discharge channel 27 and a hydrogen-containing gas supplied from a hydrogen source through the anode gas introduction channel 26. Specifically, the anode gas discharge channel 27 is a recycling flow channel for supplying the hydrogen-containing gas discharged from the anode outlet $6_{OUT}$ to the anode gas introduction channel 26 disposed upstream of the dew point adjuster 22 and the gas supply 23. The hydrogen supply system 200 has a structure in which the hydrogen-containing gas with the dew point adjusted by the dew point adjuster 22 is supplied to the anode inlet $6_{IN}$ through the anode gas introduction channel 26. However, this structure for recycling the hydrogen-containing gas is merely an example, and this example is not a limitation. For example, the entire amount of the hydrogen-containing gas supplied to the anode inlet $6_{IN}$ through the anode gas introduction channel 26 may be compressed from the anode AN of the cell 40 to the cathode CA.

The gas supply 23 is a device that is disposed in the anode gas introduction channel 26 and supplies the hydrogen-containing gas from the hydrogen source to the anode inlet $6_{IN}$ of the anode AN. The gas supply 23 may have any structure so long as it can supply the hydrogen-containing gas.

For example, the gas supply 23 may be a device that adjusts the flow rate of the hydrogen-containing gas flowing through the anode gas introduction channel 26. In this case, the gas supply 23 is composed of, for example, a booster and a flow rate control valve but may be composed of one of them. Examples of the booster include a pump.

The hydrogen reservoir 25 is a device that stores high-pressure hydrogen ($H_2$) introduced from the cathode flow channel 7 (see FIG. 2A) of the cathode CA through the cathode gas discharge channel 28. The hydrogen reservoir 25 may have any structure so long as it can store high-pressure hydrogen. Examples of the hydrogen reservoir 25 include a tank. The hydrogen stored in the hydrogen reservoir 25 can be supplied to an unillustrated hydrogen consumer in a timely manner by opening an unillustrated on-off valve. Examples of the hydrogen consumer include a fuel cell.

Although not shown in FIG. 3, members, devices, etc. necessary for the hydrogen supply operation of the hydrogen supply system 200 in the present embodiment are provided as appropriate.

For example, a condenser that removes water from the high-pressure hydrogen-containing gas discharged from the cathode flow channel 7 (see FIG. 2A) of the cathode CA before the hydrogen-containing gas flows into the hydrogen reservoir 25 may be disposed in the cathode gas discharge channel 28. In this case, an on-off valve may be disposed between the condenser and the cathode flow channel 7 of the cathode CA within the cathode gas discharge channel 28.

For example, an on-off valve and a check valve may be disposed in the anode gas discharge channel 27. In this case, the check valve is disposed such that the flow direction of the hydrogen-containing gas discharged from the anode outlet $6_{OUT}$ toward a connection portion between the anode gas discharge channel 27 and the anode gas introduction channel 26 coincides with the forward direction of the check valve. This can prevent the back flow of the hydrogen-containing gas in the anode gas discharge channel 27 when the on-off valve is opened.

The above-described unillustrated members and devices are merely examples, and these examples are not limitations.

[Operation]

Next, the hydrogen compression operation of the electrochemical hydrogen compressor 100 will be described with reference to the drawings.

The following operation may be performed, for example, by causing the arithmetic circuit of the controller 50 to read a control program from the storage circuit of the controller 50. However, it is not always necessary that the controller 50 perform the following operation. The operator may perform part of the operation.

The hydrogen-containing gas is supplied to the anode AN of the electrochemical hydrogen compressor 100 through the anode gas introduction channel 26, and electric power of the voltage applicator 21 is supplied to the electrochemical hydrogen compressor 100.

Then hydrogen molecules are separated into hydrogen ions (protons) and electrons through an oxidation reaction (formula (2)) in the anode catalyst layer 2A of the electrochemical hydrogen compressor 100. The protons transmit through the electrolyte membrane 1 and move to the cathode catalyst layer 2C. The electrons move to the cathode catalyst layer 2C of the cathode through the voltage applicator 21. Then, in the cathode catalyst layer 2C, hydrogen molecules are regenerated through a reduction reaction (formula (3)).

In this case, it is known that, during transmission of the protons through the electrolyte membrane 1, a prescribed amount of water moves as electroosmotic water from the anode AN to the cathode CA together with the protons.

By increasing pressure loss in the cathode gas discharge channel 28 using an unillustrated on-off valve, the pressure of the hydrogen generated in the cathode CA can be increased. Therefore, high-pressure hydrogen can be supplied from the electrochemical hydrogen compressor 100 to the hydrogen reservoir 25 in a timely manner.

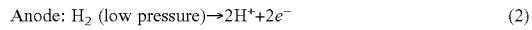

Anode: $H_2$ (low pressure)→$2H^+ + 2e^-$ (2)

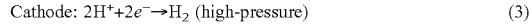

Cathode: $2H^+ + 2e^- →H_2$ (high-pressure) (3)

As described above, in the electrochemical hydrogen compressor 100, by applying a voltage between the anode AN and the cathode CA, the operation that supplies the compressed hydrogen gas from the anode AN to the cathode CA is performed. In this manner, the hydrogen compressed in the cathode CA is temporarily stored in the hydrogen reservoir 25. The hydrogen stored in the hydrogen reservoir 25 is supplied to a hydrogen consumer such as a fuel cell in a timely manner.

In the operation that supplies the compressed hydrogen gas from the anode AN to the cathode CA in the electrochemical hydrogen compressor 100, when the temperature of the cell 40 of the electrochemical hydrogen compressor 100 increases, the operation that increases the dew point of the hydrogen-containing gas to be supplied to the anode AN is performed.

As described above, with the electrochemical hydrogen compressor 100 and the method for operating the electrochemical hydrogen compressor 100 in the present embodiment, the efficiency of the hydrogen compression operation can be further improved as compared with conventional compressors and methods. Specifically, since the latent heat generated during condensation of water vapor and the heat generated by IR loss can be used to heat the cell of the electrochemical hydrogen compressor 100, the electrochemical hydrogen compressor 100 can be heated to a desired temperature efficiently.

Next, condensation of water vapor when the hydrogen in the hydrogen-containing gas present in the anode AN moves to the cathode CA at a hydrogen utilization rate of about 70% will be described as an example.

In this example, the amount of hydrogen in the hydrogen-containing gas discharged from the anode AN is about 30% of the amount of hydrogen in the hydrogen-containing gas supplied to the anode AN. Suppose that the temperature of the cell 40 is constant. Then, since the hydrogen-containing gas discharged from the anode AN is in a fully humidified state, the amount of water vapor in the hydrogen-containing gas discharged from the anode is also about 30% of the amount of water vapor in the hydrogen-containing gas supplied to the anode AN. A remaining part of the water vapor is discharged from the anode AN as condensed water or moves from the anode to the cathode CA together with protons as electroosmotic water. Suppose that the cathode CA is sealed. Then, when the temperature is constant, the amount of saturated vapor that can be present in the cathode CA is constant, and therefore surplus water vapor exceeding the amount of saturated water vapor condenses. Specifically, about 70% of the amount of water vapor in the hydrogen-containing gas supplied to the anode AN may be condensed in the cell 40.

When condensation of water vapor occurs in the anode AN and the cathode CA, the latent heat generated during the condensation of water vapor can be used to increase the temperature of the cell 40.

As described above, the results of the computations using the simple computational model verify that the cell 40 of the electrochemical hydrogen compressor 100 can be appropriately heated by the latent heat generated during condensation of water vapor and heat generated by IR loss when the temperature of the cell 40 of the electrochemical hydrogen compressor 100 falls within the range of about 30° C. to about 65° C.

However, the above description for water vapor condensation is merely an example, and this example is not a limitation. The condensation of water vapor when the cathode CA is sealed has been described, but this is not a limitation. For example, even when the cathode CA is not sealed, water vapor in hydrogen discharged from the cathode flow channel 7 tends to condensate near the discharge port of the cathode flow channel 7 so long as the temperature of the cell 40 is higher than the ambient temperature and the cathode flow channel 7 extends in a vertical direction such that the opening of its discharge port is directed upward as shown in FIG. 2A. Therefore, even when the cathode CA is not sealed, about 70% of the amount of water vapor in the hydrogen-containing gas supplied to the anode AN condenses in or near the cell 40, so that the latent heat generated during condensation of water vapor can be appropriately used to increase the temperature of the cell 40.

When the temperature of the cell 40 of the electrochemical hydrogen compressor 100 increases, if the dew point of the hydrogen-containing gas to be supplied to the anode AN is constant, the proton conductivity of the electrolyte membrane 1 decreases because the relative humidity in the cell 40 decreases as the temperature of the cell 40 increases. Then the voltage necessary for the hydrogen compression operation of the electrochemical hydrogen compressor 100 increases, and there is the possibility that the efficiency of the hydrogen compression operation of the electrochemical hydrogen compressor 100 may decrease.

However, in the electrochemical hydrogen compressor 100 and the method for operating the electrochemical hydrogen compressor 100 in the present embodiment, the dew point adjuster 22 increases the dew point of the hydrogen-containing gas to be supplied to the anode AN when the temperature of the cell 40 increases, so that the above possibility can be reduced.

In the electrochemical hydrogen compressor 100 and the method for operating the electrochemical hydrogen compressor 100 in the present embodiment, the ratio of condensed water produced by condensation of water vapor in the hydrogen-containing gas is maintained at a high value even when the temperature of the cell 40 increases. Therefore, the electrochemical hydrogen compressor 100 and the method for operating the electrochemical hydrogen compressor 100 in the present embodiment can effectively utilize the latent heat generated during condensation of water vapor to heat the call 40 of the electrochemical hydrogen compressor 100 even when the temperature of the cell 40 increases.

In the electrochemical hydrogen compressor 100 and the method for operating the electrochemical hydrogen compressor 100 in the present embodiment, the humidified hydrogen-containing gas is supplied to the anode AN, for example, at the startup. Therefore, heating of the cell using the latent heat generated during condensation of water vapor can be effectively used at the startup.

First Example

An electrochemical hydrogen compressor 100 in the present example is the same as the electrochemical hydrogen compressor 100 in the above embodiment except for the details of the following control by the controller 50.

The controller 50 controls the voltage applicator 21 such that part of the hydrogen in the hydrogen-containing gas supplied to the anode AN is compressed and the remaining part of the hydrogen is not compressed.

If the entire amount of the hydrogen in the hydrogen-containing gas supplied to the anode AN is compressed from the anode AN of the cell 40 to the cathode CA, an excessively large amount of condensed water may dwell in the anode AN, and flooding may occur in the anode AN. In this case, the diffusion overvoltage of the cell 40 of the electrochemical hydrogen compressor 100 may increase.

In the electrochemical hydrogen compressor 100 in the present example, part of the hydrogen in the hydrogen-containing gas supplied to the anode AN is recycled as described in the above control, and the condensed water dwelling in the anode AN can be discharged to the outside of the anode AN through the action of the flow of the hydrogen-containing gas. Therefore, in the electrochemical hydrogen compressor 100 in the present example, the possibility of the occurrence of flooding in the anode AN can be lower than that when the entire amount of the hydrogen in the hydrogen-containing gas is compressed from the anode AN of the cell 40 to the cathode.

The electrochemical hydrogen compressor 100 in the present example may be the same as the electrochemical hydrogen compressor 100 in the embodiment except for the above feature.

Modification

Figure 4:
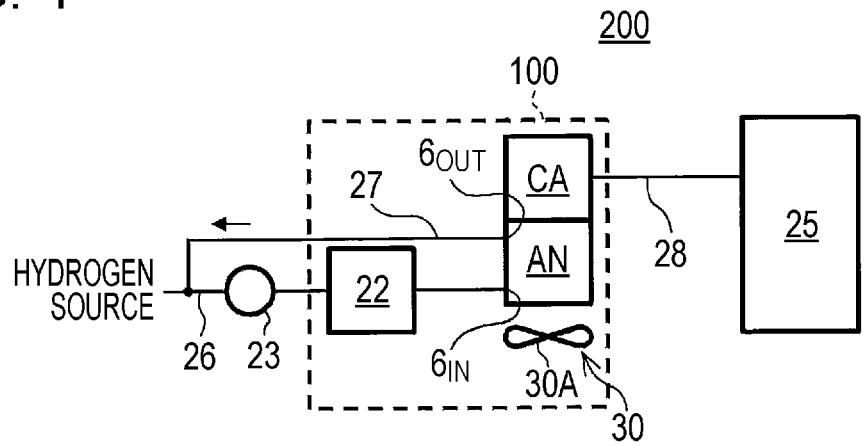
FIG. 4 is an illustration showing an example of a hydrogen supply system including an electrochemical hydrogen compressor in a modification of the embodiment.

FIG. 4 is an illustration showing an example of a hydrogen supply system including an electrochemical hydrogen compressor in a modification of the embodiment.

In the example shown in FIG. 4, the hydrogen supply system is the same as the hydrogen supply system 200 in FIG. 3 except that the electrochemical hydrogen compressor 100 includes an air cooler 30 and that the controller 50 performs the following control.

The air cooler 30 is a device that cools the cell 40 of the electrochemical hydrogen compressor 100. The air cooler 30 may have any structure so long as it can air-cool the cell 40 of the electrochemical hydrogen compressor 100. In the present modification, the air cooler 30 includes an air blowing fan 30A, and air (cool air) from the air blowing fan 30A is used to cool the cell 40 from its surface.

The controller 50 actuates the air cooler 30 when the amount of heat generated in the cell of the electrochemical hydrogen compressor 100 increases.

In the electrochemical hydrogen compressor 100 in the present modification, the temperature of the cell of the electrochemical hydrogen compressor 100 can be controlled by air cooling more simply than in a structure in which cooling water, for example, is circulated in the cell 40. As described above, the results of the computations using the simple computational model verify that the temperature of the cell of the electrochemical hydrogen compressor 100 can be controlled by air cooling.

When the electrochemical hydrogen compressor 100 is used in a subzero environment during a suspension period in the winter, it is feared that the electrochemical hydrogen compressor 100 may freeze. However, in this case, by providing an auxiliary heater, for example, to the electrochemical hydrogen compressor 100 or by sending hot air instead of the cool air from the air blowing fan 30A to the cell 40 of the electrochemical hydrogen compressor 100, the electrochemical hydrogen compressor 100 can be prevented from freezing.

The electrochemical hydrogen compressor 100 in the present modification may be the same as the electrochemical hydrogen compressor 100 in the embodiment or the first example of the embodiment except for the above feature.

Second Example

An electrochemical hydrogen compressor 100 in the present example is the same as the electrochemical hydrogen compressor 100 in the embodiment except that the hydrogen-containing gas supplied to the anode AN contains a hydrogen-containing gas generated by water electrolysis.

Specifically, in the present example, the hydrogen in the hydrogen source in FIG. 3 is generated by a water electrolysis device (not shown). The water electrolysis device may generate hydrogen using electric power generated from renewable energy such as sunlight. Any water electrolysis method may be used for the water electrolysis device. Examples of the water electrolysis in the water electrolysis device include solid polymer type water electrolysis.

The hydrogen-containing gas generated by water electrolysis contains water vapor. For example, the hydrogen-containing gas is in a high-humidity state with a dew point of about 80° C. Therefore, the electrochemical hydrogen compressor 100 in the present example can desirably use the hydrogen-containing gas generated by water electrolysis as the hydrogen-containing gas to be supplied to the anode AN.

The electrochemical hydrogen compressor 100 in the present example may be the same as the electrochemical hydrogen compressor 100 in any of the embodiment, the first example of the embodiment, and the modification of the embodiment except for the above feature.

Third Example

An electrochemical hydrogen compressor 100 in the present example is the same as the electrochemical hydrogen compressor 100 in the embodiment except that the hydrogen-containing gas supplied to the anode AN contains a hydrogen-containing gas generated by a reforming reaction of a hydrocarbon compound.

Specifically, in the present example, the hydrogen in the hydrogen source in FIG. 3 is generated in a reformer (not shown). Any type of reforming reaction may be used in the reformer. Examples of the reforming reaction in the reformer include a water vapor reforming reaction, a partial oxidation reaction, and an autothermal reaction. Examples of the hydrocarbon compound include town gas containing methane as a main component and natural gas.

The hydrogen-containing gas generated by the reforming reaction of the hydrocarbon compound contains water vapor. For example, the hydrogen-containing gas is in a high-humidity state with a dew point of about 80° C. Therefore, the electrochemical hydrogen compressor 100 in the present example can desirably use the hydrogen-containing gas generated by the reforming reaction of the hydrocarbon compound as the hydrogen-containing gas to be supplied to the anode AN.

The electrochemical hydrogen compressor 100 in the present example may be the same as the electrochemical hydrogen compressor 100 in any of the embodiment, the first and second examples of the embodiment, and the modification of the embodiment except for the above feature.

Fourth Example

Figure 5:
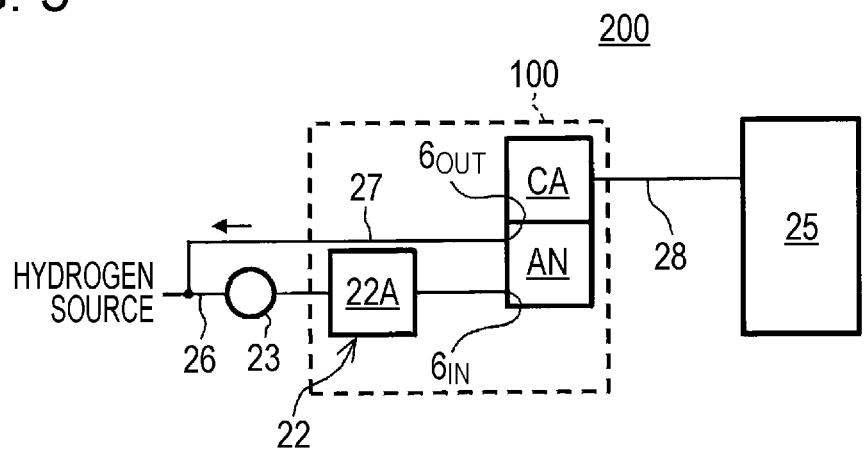
FIG. 5 is an illustration showing an example of a hydrogen supply system including an electrochemical hydrogen compressor in a fourth example of the embodiment.

FIG. 5 is an illustration showing an example of a hydrogen supply system including an electrochemical hydrogen compressor in a fourth example of the embodiment.

In the example shown in FIG. 5, the hydrogen supply system is the same as the hydrogen supply system 200 in FIG. 3 except that the dew point adjuster 22 of the electrochemical hydrogen compressor 100 includes a condenser 22A and that the controller 50 performs the following control.

The condenser 22A is a device that condenses water vapor in the hydrogen-containing gas to be supplied to the anode AN. The condenser 22A may have any structure so long as it can condense the water vapor in the hydrogen-containing gas to be supplied to the anode AN.

For example, the condenser 22A may include a condensing tank (not shown) and may be configured such that the hydrogen-containing gas passes through the condensing tank. The condenser 22A may be configured such that the temperature of the hydrogen-containing gas in the condensing tank is reduced to a desired temperature by a temperature control mechanism (not shown). In this case, the water vapor in the hydrogen-containing gas can be condensed in the condensing tank of the condenser 22A. The condensed water generated by water vapor condensation is accumulated in a lower portion of the condensing tank.

For example, the condenser 22A may include a bubbling tank (not shown) and may be configured such that the hydrogen-containing gas passes through water in the bubbling tank. The condenser 22A may be configured such that the temperature of the water in the bubbling tank is maintained at a desired temperature by a temperature control mechanism (not shown). In this case, the dew point of the hydrogen-containing gas that have passed through the water in the bubbling tank is approximately equal to the temperature of the water in the bubbling tank. Therefore, by decreasing the water temperature to a temperature lower than the dew point of the hydrogen-containing gas before it flows into the bubbling tank, the water vapor in the hydrogen-containing gas can be condensed in the bubbling tank of the condenser 22A.

When the temperature of the cell 40 of the electrochemical hydrogen compressor 100 increases, the controller 50 controls the condenser 22A to reduce the amount of water condensed from the hydrogen-containing gas to be supplied to the anode AN. For example, when the condenser 22A includes the condensing tank, the amount of water condensed from the hydrogen-containing gas can be reduced by causing the controller 50 to increase the temperature of the hydrogen-containing gas in the condensing tank to a desired temperature using the temperature control mechanism.

As described above, in the electrochemical hydrogen compressor 100 in the present example, when the temperature of the cell 40 increases, the amount of water condensed from the hydrogen-containing gas in the condenser is reduced, and the dew point of the hydrogen-containing gas to be supplied to the anode AN can thereby be increased appropriately.

For example, by reducing or increasing the amount of condensed water in the condenser 22A to bring the dew point of the hydrogen-containing gas and the temperature of the cell 40 close to each other, the occurrence of flooding in the anode AN and drying up of the electrolyte membrane 1 can be prevented while the latent heat generated during condensation of water vapor in the cell 40 is effectively used to heat the cell. In this case, it is desirable that the dew point is approximately the same as the temperature of the cell 40 or that the temperature of the hydrogen-containing gas supplied to the anode AN of the cell 40 is slightly higher than the temperature of the cell 40.

The electrochemical hydrogen compressor 100 in the present example may be the same as the electrochemical hydrogen compressor 100 in any of the embodiment, the first to third examples of the embodiment, and the modification of the embodiment except for the above feature.

Fifth Example

Figure 6:
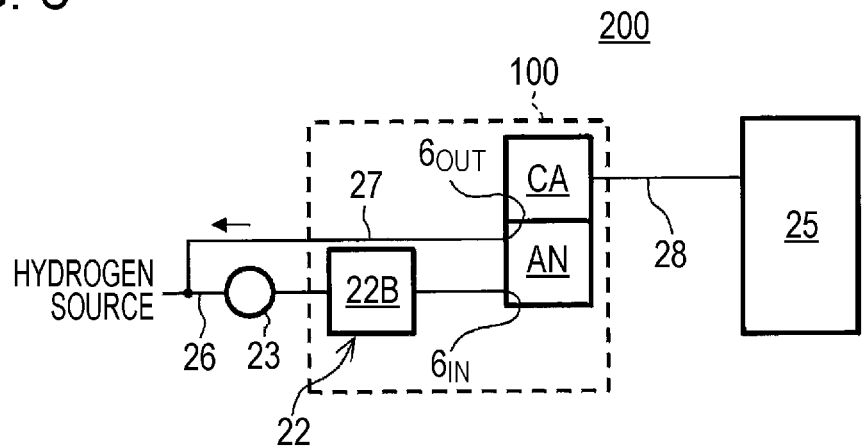
FIG. 6 is an illustration showing an example of a hydrogen supply system including an electrochemical hydrogen compressor in a fifth example of the embodiment.

FIG. 6 is an illustration showing an example of a hydrogen supply system including an electrochemical hydrogen compressor in a fifth example of the embodiment.

In the example shown in FIG. 6, the hydrogen supply system is the same as the hydrogen supply system 200 in FIG. 3 except that the dew point adjuster 22 of the electrochemical hydrogen compressor 100 includes a humidifier 22B and that the controller 50 performs the following control.

The humidifier 22B is a device that humidifies the hydrogen-containing gas to be supplied to the anode AN. The humidifier 22B may have any structure so long as it can humidify the hydrogen-containing gas to be supplied to the anode AN.

For example, the humidifier 22B may include a bubbling tank (not shown) and may be configured such that the hydrogen-containing gas passes through water in the bubbling tank. The humidifier 22B may be configured such that the temperature of the water in the bubbling tank is maintained at a desired temperature using a temperature control mechanism (not shown). In this case, the dew point of the hydrogen-containing gas that has passed through the water in the bubbling tank is approximately equal to the temperature of the water in the bubbling tank. Therefore, by increasing the water temperature to a temperature higher than the dew point of the hydrogen-containing gas before it flows into the bubbling tank, the hydrogen-containing gas can be humidify in the bubbling tank of the humidifier 22B.

When the temperature of the cell 40 of the electrochemical hydrogen compressor 100 increases, the controller 50 controls the humidifier 22B to increase the humidity of the hydrogen-containing gas to be supplied to the anode AN. For example, when the humidifier 22B includes the bubbling tank, the humidity of the hydrogen-containing gas can be increased by causing the controller 50 to increase the temperature of the water in the bubbling tank to a desired temperature using a temperature control mechanism.

In the electrochemical hydrogen compressor 100 in the present example, when the temperature of the cell 40 increases, the humidity of the hydrogen-containing gas in the humidifier 22B can be increased to thereby increase the dew point of the hydrogen-containing gas to be supplied to the anode AN appropriately.

For example, by increasing or decreasing the amount of humidification by the humidifier 22B to bring the dew point of the hydrogen-containing gas and the temperature of the cell 40 close to each other, the occurrence of flooding in the anode AN and drying up of the electrolyte membrane 1 can be prevented while the latent heat generated during condensation of water vapor in the cell 40 is effectively used to heat the cell. In this case, it is desirable that the dew point is approximately the same as the temperature of the cell 40 or that the temperature of the hydrogen-containing gas supplied to the anode AN of the cell 40 is slightly higher than the temperature of the cell 40. Specifically, it is desirable that the dew point of the hydrogen-containing gas is adjusted to be equal to or lower than the cell temperature +5° C. and that, when the temperature of the cell increases, the dew point adjuster is controlled to increase the dew point of the hydrogen-containing gas. It is more desirable that the controller controls the dew point adjuster to adjust the dew point of the hydrogen-containing gas to be equal to or lower than the temperature of the cell and that, when the temperature of the cell increases, the controller controls the dew point adjuster to increase the dew point of the hydrogen-containing gas.

The electrochemical hydrogen compressor 100 in the present example may be the same as the electrochemical hydrogen compressor 100 in any of the embodiment, the first to third examples of the embodiment, and the modification of the embodiment except for the above feature.

The embodiment, the first to fifth examples of the embodiment, and the modification of the embodiment may be combined with each other so long as they do not exclude each other.

From the foregoing description, many modifications and other embodiments of the present disclosure will be apparent to those skilled in the art. Therefore, the foregoing description is to be construed as illustrative only and is provided for the purpose of teaching those skilled in the art the best mode of carrying out the present disclosure. The details of the structure and/or function of the present disclosure may be changed substantially without departing from the spirit of the present disclosure.

The aspects of the present disclosure can be used, for example, for the electrochemical hydrogen compressor 100 that can perform the hydrogen compression operation with improved efficiency as compared with conventional compressors and for the method for operating the electrochemical hydrogen compressor 100.

What is claimed is:

1. An electrochemical hydrogen compressor comprising:
    a cell including a proton conductive electrolyte membrane having a pair of principal surfaces, a cathode disposed on a first one of the principal surfaces of the electrolyte membrane, and an anode disposed on a second one of the principal surfaces of the electrolyte membrane;
    a voltage applicator that applies a voltage between the anode and the cathode;
    a dew point adjuster that adjusts a dew point of a hydrogen-containing gas to be supplied to the anode; and
    a controller that, when the temperature of the cell increases, controls the dew point adjuster to increase the dew point of the hydrogen-containing gas.

2. The electrochemical hydrogen compressor according to claim 1,
    wherein, at startup, the controller controls the dew point adjuster such that a humidified hydrogen-containing gas is supplied to the anode.

3. The electrochemical hydrogen compressor according to claim 1,
    wherein the controller controls the voltage applicator such that a part of hydrogen in the hydrogen-containing gas is compressed and a remaining part of the hydrogen is not compressed.

4. The electrochemical hydrogen compressor according to claim 1, further comprising a cooler that cools the cell,
    wherein the controller actuates the cooler when the amount of heat generated in the cell increases.

5. The electrochemical hydrogen compressor according to claim 1,
    wherein the hydrogen-containing gas contains a hydrogen-containing gas generated by water electrolysis.

6. The electrochemical hydrogen compressor according to claim 1,
    wherein the hydrogen-containing gas contains a hydrogen-containing gas generated by a reforming reaction of a hydrocarbon compound.

7. The electrochemical hydrogen compressor according to claim 1,
    wherein the dew point adjuster includes a condenser, and
    wherein, when the temperature of the cell increases, the controller controls the condenser to reduce the amount of water condensed from the hydrogen-containing gas.

8. The electrochemical hydrogen compressor according to claim 1,
    wherein the dew point adjuster includes a humidifier, and
    wherein, when the temperature of the cell increases, the controller controls the humidifier to increase the humidity of the hydrogen-containing gas.

9. The electrochemical hydrogen compressor according to claim 1,
    wherein the controller controls the dew point adjuster to adjust the dew point of the hydrogen-containing gas to be equal to or lower than the temperature of the cell +5° C., and
    wherein, when the temperature of the cell increases, the controller controls the dew point adjuster to increase the dew point of the hydrogen-containing gas.

10. The electrochemical hydrogen compressor according to claim 1,
    wherein the controller controls the dew point adjuster to adjust the dew point of the hydrogen-containing gas to be equal to or lower than the temperature of the cell, and
    wherein, when the temperature of the cell increases, the controller controls the dew point adjuster to increase the dew point of the hydrogen-containing gas.

11. A method for operating an electrochemical hydrogen compressor, the method comprising:
    (a) applying a voltage between an anode of a cell and a cathode of the cell to supply a compressed hydrogen gas from the anode to the cathode, the cell including a proton conductive electrolyte membrane having a pair of principal surfaces, the cathode disposed on a first one of the principal surfaces of the electrolyte membrane, and the anode disposed on a second one of the principal surfaces of the electrolyte membrane; and (b), when the temperature of the cell increases in (a), increasing the dew point of a hydrogen-containing gas to be supplied to the anode.

* * * * *